Patented Mar. 13, 1945

2,371,544

UNITED STATES PATENT OFFICE 2,371,544

METHOD OF PRESERVING LATEX AND THE PRODUCT THEREOF

Chester E. Rhines, Glen Rock, N. J., assignor to United States Rubber Company, New York, N. Y., a corporation of New Jersey No Drawing. Application December 12, 1940, Serial No. 369,751

4 Claims. (Cl. 260—820)

This invention relates to a method of preserving latex and the product thereof.

Ammonia preserved Hevea latex whether preserved by the addition of about 1% to 1.25% of ammonia as is common practice, or by the addition first of formaldehyde and then an excess of ammonia (patent to McGavack 1,872,161), or by the addition of smaller amounts of ammonia together with a germicidal agent such as hydroxylamine, alkyl mercury ester, arsenic oxide, sodium pentachlorphenate, or the like, contains a certain amount of titratable acidic material. This may be measured by the "KOH number," which is the number of grams of KOH per 100 grams of latex solids corresponding to the end point in the electrometric titration of the latex. The KOH numbers of commercially available normal latices have been found to vary between 1.2 and 2.4 and those of creamed or centrifuged latices between 0.55 and 0.95. (Reference, "The KOH number test and its application to the compounding of zinc oxide in rubber latex," by H. F. Jordan, in Proceedings of the Rubber Technology Conference, May 23–25, 1938, at London, Eng., Pub. by W. Heffer & Sons Ltd., Cambridge, England.)

I have found that the KOH number of latex may be considerably reduced if the latex is preserved in such a manner that carbon dioxide is removed from the latex while the latex is in a non-alkaline condition. The carbon dioxide contained in fresh latex accounts for about one-third the KOH number of latex as it is tapped, and any proportion of this carbon dioxide may readily be removed from the latex, if the latex is in a non-alkaline condition, in various manners, as by blowing air through the latex at atmospheric pressure, by aeration at reduced pressure, by boiling at reduced pressure, or by spraying the latex or running it in a thin stream while exposing it to the atmosphere.

In carrying out the present invention, carbon dioxide is removed from the latex by any of the methods described above without substantial evaporation of water from the latex, otherwise the removal of the carbon dioxide will be accompanied by the formation of coagula in the latex. The evaporation of water from the latex may be kept at a minimum by using moist air in blowing out the carbon dioxide, or by keeping the blowing time as short as possible consistent with the removal of the desired amount of carbon dioxide. Substantially all the carbon dioxide may be removed, if desired. In any case, the carbon dioxide should be reduced so that the carbon dioxide content of the latex is not more than .04 milliequivalent of $CO_2$ per gram of latex solids. No preservative is necessary for the latex during the carbon dioxide or volatile acid removing process if the procedure is conducted directly after tapping and collecting the latex. Serious damage from bacterial growth may result, however, unless this procedure is completed within two hours from the time of tapping and collecting. Unpreserved latex must be treated with ammonia or other alkali preservative immediately on completion of the carbon dioxide removal. Preferably, however, a neutral or acidic preservative is added to the latex on tapping so that the latex may be held for a number of days, if desired, before the process of removing carbon dioxide is carried out. Two-tenths per cent. of formaldehyde based on the latex has been found satisfactory for preserving the latex in the non-alkaline condition through the carbon dioxide removal, and likewise small amounts of other non-alkaline preservatives such as arsenic oxide, hydroxylamine hydrochloride, and ethyl mercury chloride may be used. Sodium pentachlorphenate, even though somewhat alkaline in aqueous solution, is satisfactory since when it is used in latex in the amounts necessary for preservation, the buffering action of the latex is so great that the resultant pH is approximately at the neutral point giving a non-acid latex for removal of carbon dioxide. After the removal of carbon dioxide from latices treated with these germicidal agents has been accomplished, the latex is made alkaline to a pH of at least 7.5 and preferably to at least 9.0, by the addition of a volatile alkali, such as ammonia or an amine, or a fixed alkali, such as potassium hydroxide, or an alkaline salt, such as trisodium phosphate. A sterile non-alkaline latex will not be oxidized by absorption of oxygen from the air and therefore the absorbed oxygen content of latex preserved according to the present invention will not be appreciably more than the solubility of oxygen in water, i. e., it will not be greater than .001% based on the latex.

Latex preserved according to the present invention may be used as normal latex, in which case the solids content of commercial lots will not be over 42%. If desired, the latex may be concentrated by centrifuging or creaming after the carbon dioxide removal, and preferably after addition of at least some of the alkali to the latex following the volatile acid removal. Less than the desired amount of alkali for the complete preservation of the latex may be added after the removal of carbon dioxide and before concentration, and the remaining alkali added after concentration, if it is desired to minimize the loss of alkali in the serum in the concentrating operation. Latices preserved with carbon dioxide removed according to the present invention differ from latices that have had their carbon dioxide content reduced by washing, as in multiple creaming or centrifuging operations, by having a much lower ratio of carbon dioxide content to other serum constituents, since the carbon dioxide removal in the present invention is not accompanied by a proportionate removal of other serum constituents, as in the case of multiple creaming or centrifuging.

Latices preserved according to the present invention have a low KOH number, and, for the amounts of alkali used, are unusually high in stability, are high in alkalinity as expressed in pH value, and are low in viscosity. These factors, taken together, show that a better preservation is achieved with the same amount of alkali in a latex from which carbon dioxide has been removed than in the same latex without carbon dioxide removal.

In order to illustrate the invention, the following examples of the preservation of latex according to the present method are included.

*Example I*

To a freshly tapped latex was added .2% of formaldehyde. A vessel containing a portion of the latex was attached to a water suction pump and a vigorous stream of wet carbon dioxide free air was sucked through the latex. Another portion of the latex, kept as a control for comparison, was held without aeration. The aeration of the first portion was continued for one hour, after which time both portions were treated with .85% of ammonia to accomplish permanent preservation after the ammonia was added. The aerated latex had a solids content of 39.21% and a KOH number of .75, and the control had a solids content of 39.16% and a KOH number of 1.21. A portion of the aerated latex and of the control was shipped to the United States, and a portion retained in Sumatra. After three months in Sumatra the KOH number of the aerated latex had risen to .94 and the KOH number of the control had risen to 1.53. When the samples arrived in the United States after two and one-half months from the completion of the preservation, the KOH number of the aerated latex was found to be 1.06 and of the control 1.44. The increase in the KOH number of the preserved latex on standing is probably due to hydrolysis of proteinaceous and other materials with the consequent formation of titratable acidic substances. The carbon dioxide content of the aerated latex as determined in the United States was .017 milliequivalent of $CO_2$ per gram of latex solids, whereas the carbon dioxide content of the control was .082 milliequavilent of $CO_2$ per gram of latex solids. The carbon dioxide content of ammonia preserved latices from which carbon dioxide has not been removed varies from .08 to .12 milliequivalent of $CO_2$ per gram of latex solids. The carbon dioxide content of latices preserved by the addition of formaldehyde and then an excess of ammonia after one to three days without removal of carbondioxide according to the present invention varies from .06 to .10 milliequivalent of $CO_2$ per gram of latex solids.

*Example II*

In a manner similar to Example I, portions of a latex to which .2% of formaldehyde had been added after tapping were aerated for 15 minutes at atmospheric pressure, for 1 hour at atmospheric pressure, and for 1 hour with pressure reduced to 90 mm. of mercury. On completion of the aeration process, ammonia was added to all samples, including the unaerated control, to the amount of .8%. The control showed a solids content of 40.18% and a KOH number of 1.00. The latex aerated for 15 minutes at atmospheric pressure showed a solids content of 40.10% and a KOH number of .76. The latex aerated for 1 hour at atmospheric pressure showed a total solids content of 39.99% and a KOH number of .60. Latex aerated for 1 hour with the pressure reduced to 90 mm. of mercury showed a solids content of 40.01 and a KOH number of .58.

*Example III*

Two-tenths per cent. of formaldehyde was added to a batch of freshly tapped latex and the carbon dioxide in a portion of the thus treated latex was removed by glowing air through the latex by means of a perforated pipe for a period of two hours while stirring the latex continuously to break the foam. One per cent. of ammonia was then added to the treated portion, and to the control or untreated portion. The solids content of the control was 40.95% and the KOH number .81. The solids content of the aerated latex from which carbon dioxide had been removed was 40.74% and the KOH number .63. The aerated latex was creamed by adding 0.13% ammonium alginate on the water phase and allowing to stand for 25 days, after which the cream was separated from the serum. The cream analyzed 64.03% total solids and .67% ammonia, and had a KOH number of .48. This cream was shipped to United States where the KOH number was determined to be .56 and the carbon dioxide content nil. The carbon dioxide content of centrifuged and creamed latices that have been preserved with ammonia, or formaldehyde without aeration followed by ammonia after standing one to three days varies between .007 and .024 milliequivalent of $CO_2$ per gram of latex solids. The carbon dioxide content of once centrifuged and creamed latices from which carbon dioxide has been removed according to the present invention runs less than .005 millequivalent of $CO_2$ per gram of latex solids, and is generally too low to be analytically determined. The carbon dioxide determinations as reported herein were made electrometrically by a KOH number determination in the usual manner and a KOH number determination on a duplicate sample after adding a stabilizer, in the present determinations "Emulphor-O" which is believed to be the condensation product of tetraethylene glycol with oleyl alcohol, and a known quantity of standard acid and boiling off the $CO_2$ at reduced pressure. The difference between the two titration values represents the $CO_2$ content. Carbon dioxide in latex may also be determined directly by passing $CO_2$ free air through acidified and stabilized latex and trapping and measuring the $CO_2$ swept out in standard sodium hydroxide or barium hydroxide solution.

*Example IV*

A portion of another lot of fresh latex to which .2% of formaldehyde had been added was aerated for 2 hours in a manner similar to the latex of Example 3. .2% ammonia was then added to the control and to the aerated latex. The KOH number of the control was .86 and of the aerated latex .59. The aerated latex was then concentrated by centrifuging after which .62% of ammonia was added to bring the alkali content up to the desired amount for preservation. The centrifuged latex concentrate was shipped to the United States. The KOH number there was found to be .42 and the carbon dioxide content nil.

It may readily be seen that any desired amount of the carbon dioxide content of latex may be removed by the present invention, and that as a result the KOH number of the latex is lowered and a better stabilization of the latex results.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of preserving latex which comprises acidifying latex by adding formaldehyde thereto, physically removing carbon dioxide from the thus treated latex without substantial evaporation of water therefrom until the carbon dioxide content of the latex is not more than .04 milliequivalent of $CO_2$ per gram of latex solids, and thereafter adding alkali to said latex to raise the pH to at least 7.5.

2. The method of preserving latex which comprises acidifying latex by adding formaldehyde thereto, physically removing carbon dioxide from the thus treated latex without substantial evaporation of water therefrom until the carbon dioxide content of the latex is not more than .04 milliequivalent of $CO_2$ per gram of latex solids, and thereafter adding ammonia to said latex to raise the pH to at least 7.5.

3. The method of preserving latex which comprises acidifying latex by adding formaldehyde thereto, passing air through the thus treated latex without substantial evaporation of water therefrom until the carbon dioxide content of the latex is not more than .04 milliequivalent of $CO_2$ per gram of latex solids, and thereafter adding alkali to said latex to raise the pH to at least 7.5.

4. The method of preserving latex which comprises acidifying latex by adding formaldehyde thereto, passing air through the thus treated latex without substantial evaporation of water therefrom until the carbon dioxide content of the latex is not more than .04 milliequivalent of $CO_2$ per gram of latex solids, and thereafter adding ammonia to said latex to raise the pH to at least 7.5.

CHESTER E. RHINES.